United States Patent
Huang et al.

(10) Patent No.: US 10,789,828 B2
(45) Date of Patent: Sep. 29, 2020

(54) OPENING/CLOSING DOOR REMINDING DEVICE AND METHOD FOR REMINDING OPENING/CLOSING OF DOOR

(71) Applicant: BOE Technology Group Co., Ltd., Beijing (CN)

(72) Inventors: Zicheng Huang, Beijing (CN); Liang Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/605,607

(22) PCT Filed: Apr. 29, 2019

(86) PCT No.: PCT/CN2019/084998
§ 371 (c)(1),
(2) Date: Oct. 16, 2019

(87) PCT Pub. No.: WO2019/223501
PCT Pub. Date: Nov. 28, 2019

(65) Prior Publication Data
US 2020/0242913 A1    Jul. 30, 2020

(30) Foreign Application Priority Data
May 25, 2018    (CN) .......................... 2018 1 0517318

(51) Int. Cl.
*G08B 21/18*    (2006.01)
*G08B 21/24*    (2006.01)
(Continued)

(52) U.S. Cl.
CPC ................ *G08B 21/24* (2013.01); *E06B 7/28* (2013.01); *G08B 5/36* (2013.01); *G08B 21/182* (2013.01); *H04B 10/67* (2013.01)

(58) Field of Classification Search
CPC ...... G08B 21/18; G08B 21/182; G08B 13/08; G08B 13/186; E05F 15/43; E05F 15/434; E06B 7/28
See application file for complete search history.

(56) References Cited

U.S. PATENT DOCUMENTS 4,562,664 A * 1/1986 Kambic ................. G08B 13/08
                                                      200/61.62
9,811,986 B2   11/2017 Loidreau et al.
(Continued)

FOREIGN PATENT DOCUMENTS

CN    201311692 Y    9/2009
CN    202512692 U    10/2012
(Continued)

OTHER PUBLICATIONS

First Office Action, including Search Report, for Chinese Patent Application No. 201810517318.5, dated Jun. 11, 2019, 10 pages.

*Primary Examiner* — Andrew W Bee
(74) *Attorney, Agent, or Firm* — Westman, Champlin & Koehler, P.A.

(57) ABSTRACT

An Opening/Closing door reminding device and an Opening/Closing door reminding method are provided, the Opening/Closing door reminding device includes: a light guiding element, a photosensitive element and a processing element, wherein the light guiding element is secured on a door frame, the photosensitive element and the processing element are both secured on a door panel, and the light guiding element and the photosensitive element are kept in contact with each other, wherein the light guiding element is configured to guide light emitted by a light source to the photosensitive element; the photosensitive element is configured to generate an electrical signal according to the light guided by the light guiding element, and provide the generated electrical signal to the processing element; the pro-
(Continued)

cessing element is configured to determine an Opening/Closing state of the door according to the received electrical signal, and send out a corresponding reminding signal according to the Opening/Closing state of the door.

16 Claims, 21 Drawing Sheets

(51) Int. Cl.
*G08B 5/36* (2006.01)
*H04B 10/67* (2013.01)
*E06B 7/28* (2006.01)

(56) References Cited

U.S. PATENT DOCUMENTS

| | | | |
|---|---|---|---|
| 10,663,321 B1* | 5/2020 | Martin | E05D 11/00 |
| 2011/0016971 A1* | 1/2011 | Yulkowski | E05F 15/41 |
| | | | 73/493 |
| 2016/0343217 A1 | 11/2016 | Loidreau et al. | |
| 2017/0162012 A1* | 6/2017 | Kim | E06B 7/28 |
| 2017/0356238 A1* | 12/2017 | Gitman | G08B 13/08 |
| 2018/0365943 A1* | 12/2018 | DiPoala | G08B 29/22 |

FOREIGN PATENT DOCUMENTS

| | | |
|---|---|---|
| CN | 204740688 U | 11/2015 |
| CN | 205334661 U | 6/2016 |
| CN | 105917394 A | 8/2016 |
| CN | 106097617 A | 11/2016 |
| CN | 107230306 A | 10/2017 |
| CN | 108708665 A | 10/2018 |
| JP | 2013050790 A | 3/2013 |

* cited by examiner

OPENING/CLOSING DOOR REMINDING DEVICE AND METHOD FOR REMINDING OPENING/CLOSING OF DOOR

CROSS-REFERENCE TO RELATED APPLICATION

This application is a Section 371 National Stage application of International Application No. PCT/CN2019/084998, filed on Apr. 29, 2018, entitled "OPENING/CLOSING DOOR REMINDING DEVICE AND METHOD FOR REMINDING OPENING/CLOSING OF DOOR", which has not been published yet, which claims priority to Chinese Patent Application No. 201810517318.5, filed on May 25, 2018, in the China National Intellectual Property Administration, the whole disclosure of which is incorporated herein by reference.

TECHNICAL FIELD

The present disclosure relates to the field of security door technology, and more particularly to an Opening/Closing door reminding device and a method for reminding Opening/Closing of a door.

BACKGROUND

In daily life, although people normally open/close a door at different speeds, such speeds are all within a normal range and do not have much too large difference thereamong. However, abnormal opening/closing situations tend to appear on a door, for example, people open/close the door at a speed in a range that exceeds the speed at which people normally open/close the door: or people open the door at a speed much smaller than the speed at which people normally open the door; or people open the door at a speed much smaller than the speed at which people normally open the door, and then people close the door at a speed much smaller than the normally minimal speed at which people normally close the door. It is likely that these abnormal opening/closing situations of a door are situations in which the door is not opened/closed by the homeowner, which may result in a property loss of the homeowner. Most of time, the homeowner can't know these abnormal opening/closing situations of the door, so it is necessary to design a device that can remind the homeowner of an abnormal opening/closing situation of the door.

SUMMARY

According to an aspect of the present disclosure, there is provided an Opening/Closing door reminding device, comprising: a light guiding element, a photosensitive element and a processing element, wherein the light guiding element is secured on a door frame, the photosensitive element and the processing element are both secured on a door panel, and the light guiding element and the photosensitive element are kept in contact with each other, wherein the light guiding element is configured to guide light emitted by a light source to the photosensitive element; the photosensitive element is configured to generate an electrical signal according to the light guided by the light guiding element, and provide the generated to electrical signal to the processing element; the processing element is configured to determine an Opening/Closing state of the door according to the received electrical signal, and send out a corresponding reminding signal according to the Opening/Closing state of the door.

In an embodiment, the light guiding element comprises a light shielding plate, one side of the light shielding plate being kept in contact with the photosensitive element, and the light shielding plate comprises a plurality of hollowed structures uniformly disposed along an circular arc, the photosensitive element being configured to slide along the circular arc on the one side of the light shielding plate; the light shielding plate is configured to guide the light emitted by the light source through the hollowed structures.

In an embodiment, a portion of the photosensitive element contacting the light shielding plate is provided with a groove, and a first photosensitive element group and a second photosensitive element group which have a same structure as each other are disposed in the groove, the first photosensitive element group and the second photosensitive element group are respectively arranged in a radial direction of the circular arc and arranged side by side along the circular arc, the first photosensitive element group and the second photosensitive element group have a length in the radial direction of the circular arc which is smaller than a length of each of the hollowed structures in the radial direction of the circular arc; in which the first photosensitive element group and the second sensing element group are both configured to generate an electrical signal according to the light guided by the light guiding element, and to provide the generated electrical signal to the processing element.

In an embodiment, the first photosensitive element group comprises a first photosensitive sensor and a first light emitting diode, and the second photosensitive element group comprises a second photosensitive sensor and a second light emitting diode.

In an embodiment, a surface of the side of the light shielding plate which is in contact with the photosensitive element is a mirror surface structure for reflecting the light emitted by the first light emitting diode or the second light emitting diode to the first photosensitive sensor or the second photosensitive sensor in the groove respectively.

In an embodiment, the groove and the light shielding plate cooperate with each other to define a closed space formed therebetween when the photosensitive element is in contact with a portion of the light shielding plate that is not hollowed out.

In an embodiment, a distance between respective centers of two adjacent hollowed structures is greater than a distance between a center of the first photosensitive element group and a center of the second photosensitive element group.

In an embodiment, in a direction along the circular arc, a width of each of the hollowed structures is equal to a distance between two adjacent sides which respectively belong to two adjacent hollowed structures.

In an embodiment, in a direction along the circular arc, a distance between a center of the first photosensitive element group and a center of the second photosensitive element group is larger than a sum of a width of each of the hollowed structures and a width of the first photosensitive element group; the distance between the center of the first photosensitive element group and the center of the second photosensitive element group is less than a difference between a distance between respective centers of two adjacent hollowed structures and the width of the first photosensitive element group.

In an embodiment, the processing element comprises: a processor and an alarm device, the processor is connected with the first photosensitive sensor, the second photosensitive sensor, the first light emitting diode and the second light emitting diode respectively; the processor is connected to the alarm device and is configured to determine an Opening/

Closing state of the door according to the received electrical signal, and instruct the alarm device to send out a corresponding reminding signal according to the Opening/Closing state of the door.

In an embodiment, the light shielding plate is in a shape of a semicircular, and the plurality of hollowed structures are disposed on an outer periphery of the light shielding plate.

In an embodiment, the light guiding element further comprises a light guiding plate disposed on a side of the light shielding plate facing away from the photosensitive element.

In an embodiment, the light guide plate is in a same shape as the light shielding plate.

In an embodiment, the photosensitive element is in a columnar shape with a fan section, and the groove is disposed in a bottom surface of the columnar shape being in contact with the light shielding plate.

According to an aspect of the present disclosure, there is provided a method for reminding Opening/Closing of a door using the Opening/Closing door reminding device mentioned above, such a method comprises following steps, the light guiding element receives the light of the light source and guides the light emitted by a light source to the photosensitive element;

the photosensitive element generates an electrical signal according to the light guided by the light guiding element, and supplies the generated electrical signal to the processing element:

the processing element determines the Opening/Closing state of the door according to the received electrical signal, and sends out a corresponding reminding signal according to the Opening/Closing state of the door.

In an embodiment, the step of the processing element determining the Opening/Closing state of the door according to the received electrical signal, and sending out a corresponding reminding signal according to the Opening/Closing state of the door comprises, in case where the maximum speed of opening door is less than a first threshold speed, and the opening angle of the door is increased from zero degree to an angle smaller than a first threshold angle, a first reminding signal is sent out;

in case where the maximum speed of opening door is less than a first threshold speed, and the opening angle of the door is increased from zero degree to a first angle between the first threshold angle and a second threshold angle, then the maximum speed of closing door is less than a third threshold speed, the opening angle of the door is decreased from the first angle to zero degree, a second reminding signal is sent out, wherein the second threshold angle is greater than the first threshold angle:

in case where the maximum speed of opening door is between the first threshold speed and the second threshold speed, and the opening angle of the door is increased from zero degree to the first angle, then the maximum speed of closing door is between the third threshold speed and the fourth threshold speed, the opening angle of the door is decreased from the first angle to a second angle between zero degree and the first threshold angle and then is increased from the second angle to the first angle, a third reminding signal is sent out, wherein the second threshold speed is greater than the first threshold speed, and the third threshold speed is less than the fourth threshold speed;

in case where the maximum speed of opening door is between the first threshold speed and the second threshold speed, and the opening angle of the door is increased from zero degree to a third angle greater than the second threshold angle, a fourth reminding signal is sent out;

in case where the maximum speed of opening door is greater than the second threshold speed, and the opening angle of the door is increased from zero degree to a third angle greater than the second threshold angle, or the maximum speed of closing door is greater than the fourth threshold speed, a fifth reminding signal is sent out.

DETAILED DESCRIPTION OF EMBODIMENTS

The specific implementation manner of the Opening/Closing door reminding device provided by the embodiment of the present disclosure will be described in detail below with reference to the accompanying drawings.

Figure 1:
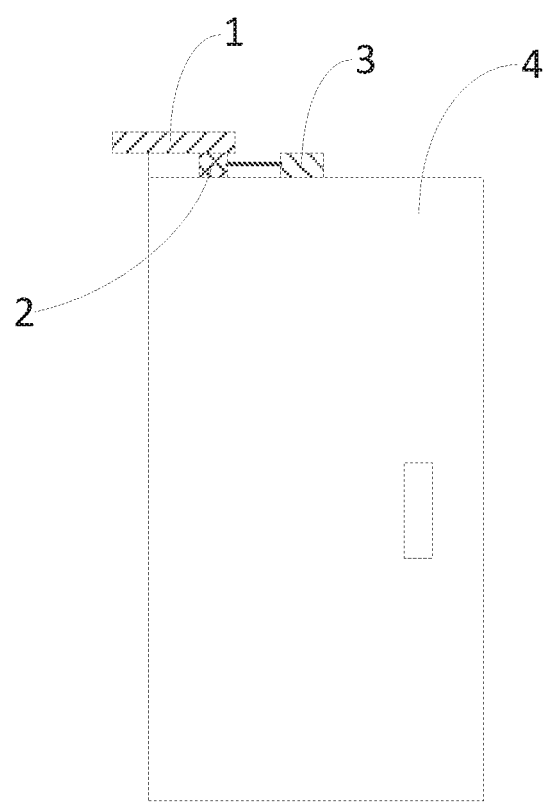
FIG. 1 is a front structural schematic view of an Opening/Closing door reminding device and a door for loading the same according to an embodiment of the present disclosure.
Figure 2A:
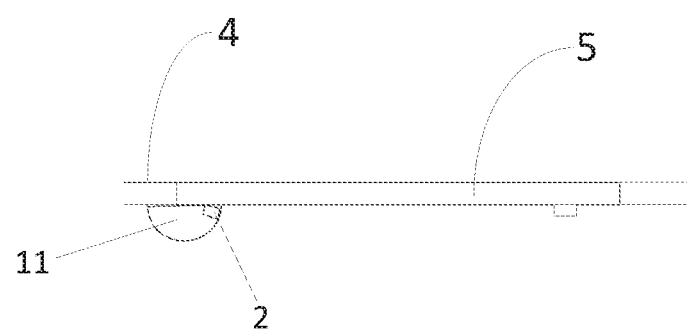
FIG. 2a is a top structural schematic view of the Opening/Closing door reminding device and the door for loading the same according to an embodiment of the present disclosure, wherein the door is in a closed state.
Figure 2B:
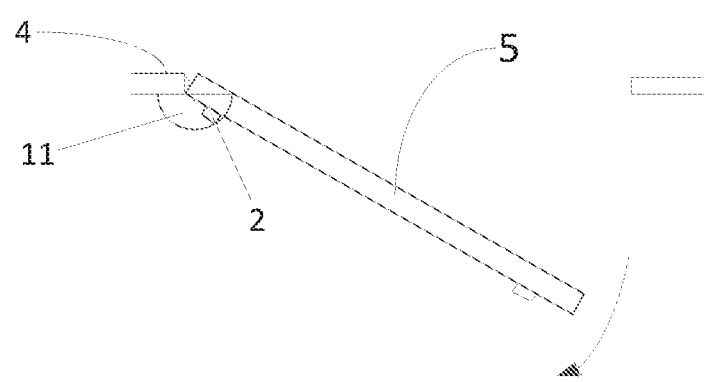
FIG. 2b is a top structural schematic view of the Opening/Closing door reminding device and the door for loading the same according to an embodiment of the present disclosure, wherein the door is in a process of opening.

An Opening/Closing door reminding device provided by an embodiment of the present disclosure is shown in FIG. 1, FIG. 2a and FIG. 2b, FIG. 1 is a front structural schematic view of an Opening/Closing door reminding device and a door for loading the same according to an embodiment of the present disclosure; FIG. 2a is a top structural schematic view of an Opening/Closing door reminding device and a door for loading the same according to an embodiment of the present disclosure, wherein the door is in a closed state; FIG. 2b is a top view of an Opening/Closing door reminding device and a door for loading the same according to an embodiment of the present disclosure, wherein the door is in a closed state; the Opening/Closing door reminding device comprises a light guiding element 1, a photosensitive element 2 and a processing element 3. The light guiding element 1 is secured on a door frame 4, the photosensitive element 2 and the processing element 3 are both fixed on a door panel 5, and the light guiding element 1 and the photosensitive element 2 are kept in contact with each other, wherein the light guiding element 1 receives the light of a light source and guides the light emitted by the light source to the photosensitive element, here the light source comprises external natural light and a light source carried by the photosensitive element.

The photosensitive element 2 is configured to generate an electrical signal according to the light guided by the light guiding element 1, and provide the generated electrical signal to the processing element 3.

The processing element 3 is configured to determine Opening/Closing state of the door according to the received electrical signal, and send out a corresponding reminding signal according to the Opening/Closing state of the door.

The present disclosure relates to an Opening/Closing door reminding device, comprising: a light guiding element, a photosensitive element and a processing element, the light guiding element is fixed on a door frame, the photosensitive element is fixed on a door panel, and the light guiding element and the photosensitive element are kept in contact with each other when the door is in an Opening/Closing state, the light guiding element is configured to guide the light emitted by the light source to the photosensitive element, and send a optical signal to the photosensitive element through the light guiding element. The photosensitive element converts the optical signal into an electrical signal, and provides the generated electrical signal to the processing element; the processing element determines the Opening/Closing state of the door according to the received electrical signal. If the door is abnormally opened or closed, the processing element sends out a corresponding reminding signal, so that the homeowner can monitor the Opening/Closing state of the door in real time, thereby improving the safety awareness.

It should be noted that the light guiding element in the embodiment of the present disclosure is exemplified to be fixed on a door frame right above the door panel. Of course, the light guiding element may also be fixed on the wall right above the door panel, as long as the requirement is satisfied that the light guiding element and the photosensitive element can be kept in contact with each other when the door is in the Opening/Closing state.

Figure 3A:
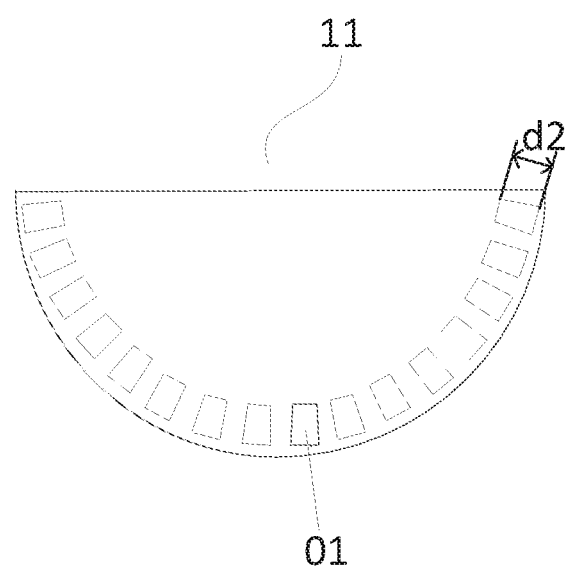
FIG. 3a is a top view of a light shielding plate of the Opening/Closing door reminding device according to an embodiment of the present disclosure.
Figure 3B:
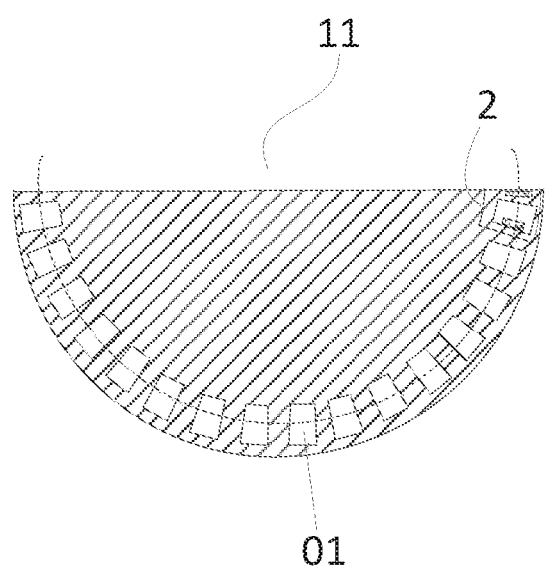
FIG. 3b is a bottom view of the light shielding plate and a photosensitive element of the Opening/Closing door reminding device according to an embodiment of the present disclosure.

Optionally, in the above-mentioned Opening/Closing door reminding device provided by the embodiment of the present disclosure, as shown in FIG. 3a to FIG. 3d, the light guiding element 1 comprises a light shielding plate 11 which is substantially semicircular, and a plurality of hollowed structures 01 are arranged on an outer periphery of the light shielding plate 11. Specifically, the plurality of hollowed structures are evenly arranged along an circular arc on the periphery of the light shielding plate, FIG. 3a is a top view of the light shielding plate 11, and FIG. 3b shows a diagram of relative positioning between the hollowed structures 01 on the outer periphery of the light shielding plate 11 of the light guiding element 1 and the photosensitive element 2, the photosensitive element 2 slides along the circular arc along which the hollowed structures 01 are arranged when the door is being opened/closed; the light shielding plate 11 is used to transmit the received light to the photosensitive element 2 through the hollowed structures 01.

Figure 4:
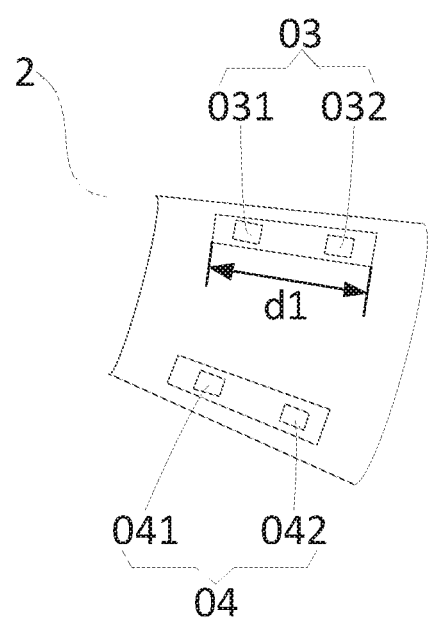
FIG. 4 is a top view of the photosensitive element of an Opening/Closing door reminding device according to an embodiment of the present disclosure.
Figure 5:
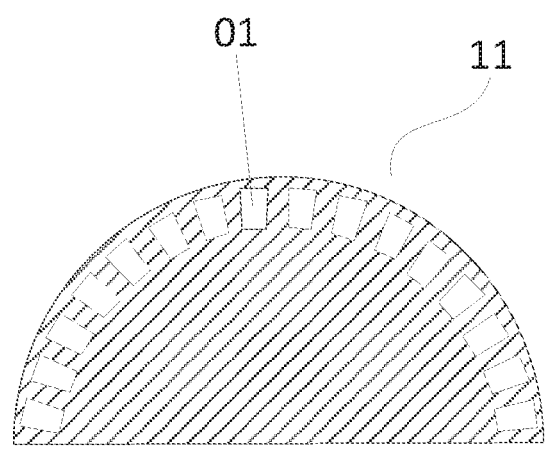
FIG. 5 is a bottom view of the light shielding plate of an Opening/Closing door reminding device according to an embodiment of the present disclosure.

Optionally, in the above-mentioned Opening/Closing door reminding device provided by the embodiment of the present disclosure, as shown in FIG. 3a, the light shielding plate 11 is shaped in a semicircular form; as shown in FIG. 4, FIG. 4 is a top view of the photosensitive element 2, the photosensitive element 2 is in a columnar shape with a fan section; as shown in FIG. 5. FIG. 5 is a bottom view of the light shielding plate 11, and a surface of the light shielding plate 11 at a side thereof being in contact with the photosensitive element 2 is a mirror surface structure.

Figure 3C:
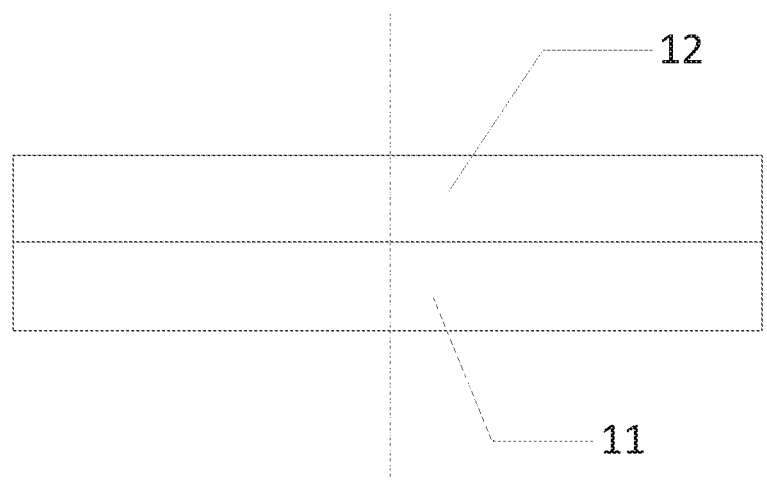
FIG. 3c is a side view of a light guide plate and a light shielding plate of the Opening/Closing door reminding device according to an embodiment of the present disclosure, in which the light guide plate and the light shielding plate are stacked on each other.
Figure 3D:
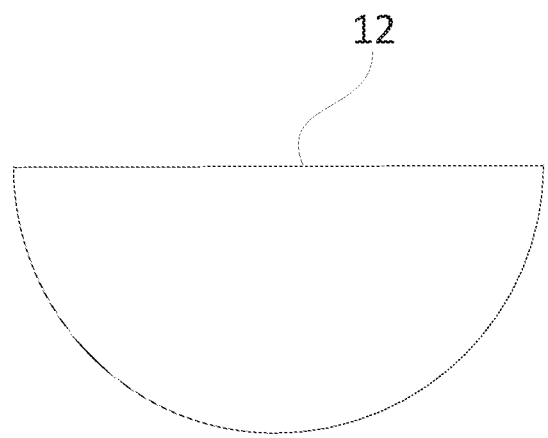
FIG. 3d is a top view of the light guide plate of an Opening/Closing door reminding device according to an embodiment of the present disclosure.

Further, in a specific implementation, in order to uniformly transmit the light of the light source into the photosensitive element, in the above-mentioned Opening/Closing door reminding device provided by the embodiment of the present disclosure, as shown in FIG. 3c and FIG. 3d, the light guiding element 1 further comprises a light guide plate 12 on a side of the light shielding plate 11 facing away from the photosensitive element, FIG. 3c is a side view of the structure of the light shielding plate 11 and the light guide plate 12, and FIG. 3d is a top view of the light guide plate 12. A shape of the light guide plate 12 is the same as the shape of the light shielding plate 11, which is also semicircular.

Figure 6:
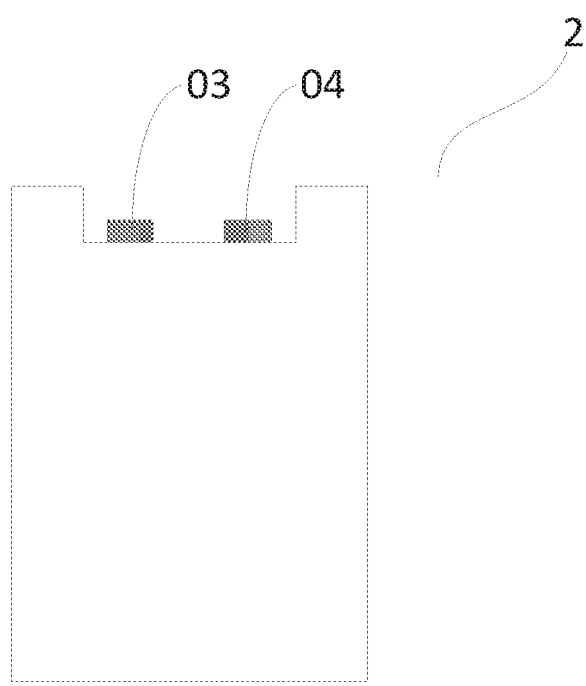
FIG. 6 is a cross-sectional view of the photosensitive element of an Opening/Closing door reminding device according to an embodiment of the present disclosure.

Optionally, in the above-mentioned Opening/Closing door reminding device provided by the embodiment of the present disclosure, as shown in FIG. 4 and FIG. 6, FIG. 6 is a cross-sectional view of the photosensitive element 2, and a groove 02 is provided on a side of the photosensitive element 2 in contact with the light shielding plate 11. A first photosensitive element group 03 and a second photosensitive element group 04 having the same structure as each other are disposed in the groove 02, and the first photosensitive element group 03 and the second photosensitive element group 04 are respectively arranged along a radial direction of the circular arc and arranged side by side in the direction of the circular arc. A length d1 of each of the first photosensitive element group 03 and the second photosensitive element group 04 in the radial direction of the circular arc (as shown in FIG. 4) is smaller than a length d2 of the hollowed structures 01 shown in FIG. 3a along the radial direction of the semicircle; therefore, the first photosensitive element group 03 and the second photosensitive element group 04 are not shielded by the rest of the light shielding plate when they are in a region of the light shielding plate occupied by the hollowed structures. Here, the region of the light shielding plate occupied by the hollowed structures, i.e., where the hollowed structures of the light shielding plate 11 are located, is defined as a hollowed region, and a region of the light shielding panel 11 other than the hollowed structures is defined as a non-hollowed region.

The first photosensitive element group 03 and the second sensing element group 04 are both used to generate an electrical signal according to the light guided by the light guiding element, and provide the generated electrical signal to the processing element 3.

Optionally, in the above-mentioned Opening/Closing door reminding device provided by the embodiment of the present disclosure, as shown in FIG. 4, the first photosensitive element group 03 comprises a first photosensitive sensor 031 and a first light emitting diode 032, and the second photosensitive element group 04 comprises a second photosensitive sensor 041 and a second light emitting diode 042.

Figure 7A:
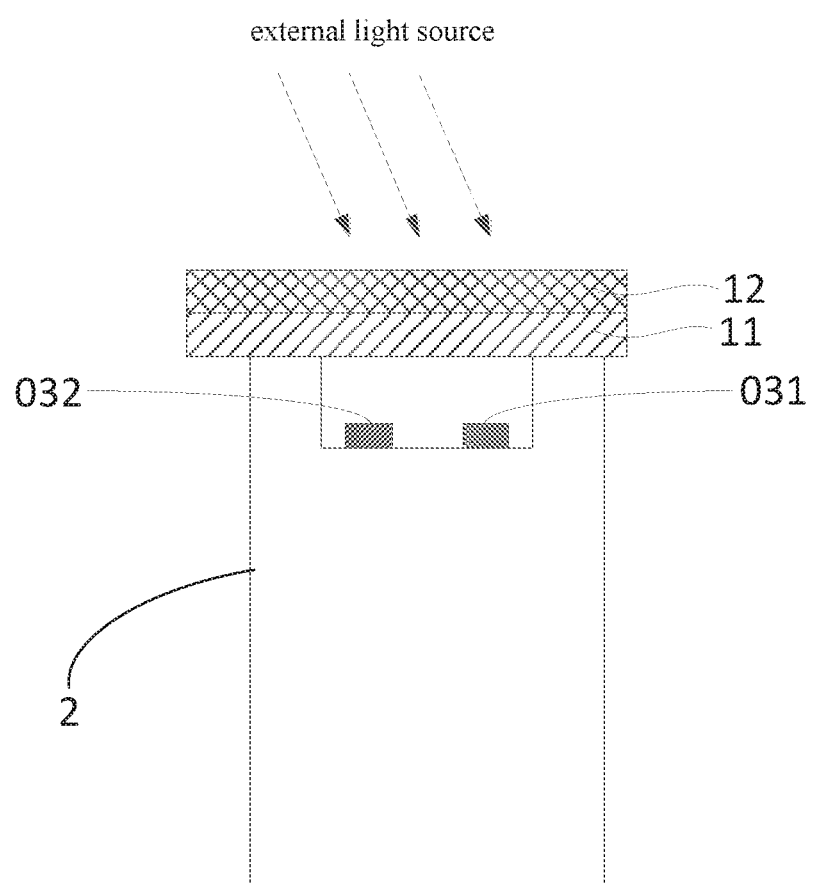
FIG. 7a-7d are operational principle diagrams of the Opening/Closing door reminding device according to an embodiment of the present disclosure, respectively, in which the operational principle of the photosensitive element in the case of different light sources are shown.
Figure 7B:
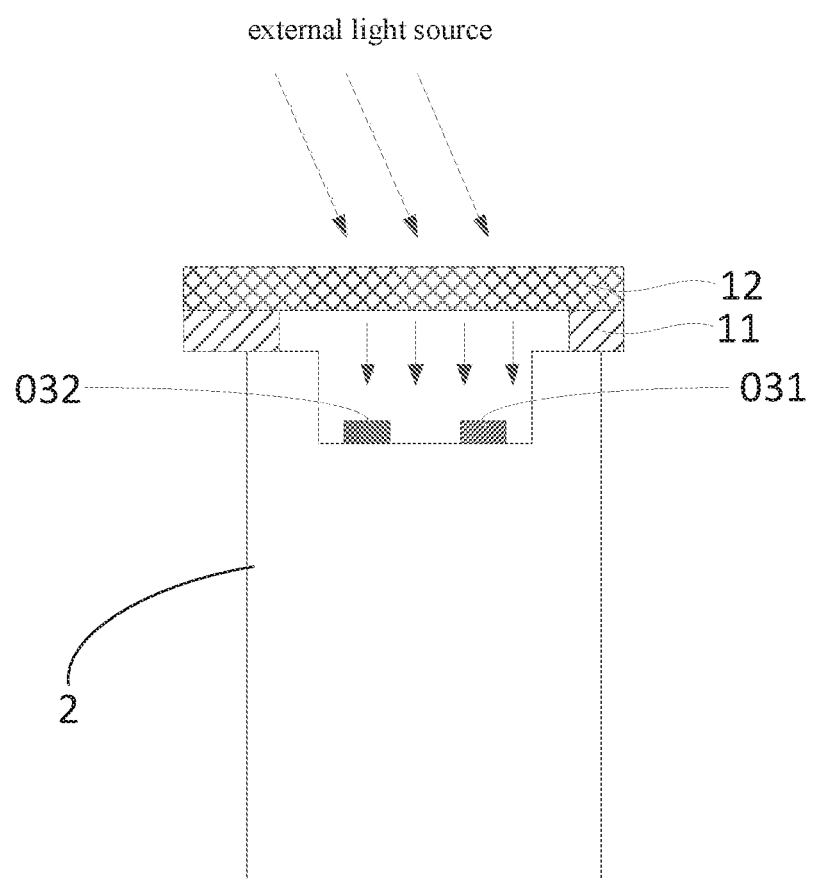

In a specific implementation, in the above-mentioned Opening/Closing door reminding device provided by the embodiment of the present disclosure, FIG. 7a and FIG. 7b are schematic diagrams of the light-sensing operational principle of the Opening/Closing door reminding device provided by the embodiment of the present disclosure under the condition of an external light source, taking a case where the first photosensitive element group 03 comprises the first photosensitive sensor 031 and the first light emitting diode 032 as an example. As shown in FIG. 7a, under the conditions of the external light source (comprising daylight/sunlight or lamp light, etc.), neither the first light emitting diode 032 nor the second light emitting diode 042 works, and the light emitted by the external light source passes through the light guide plate 12 and then passes through the hollowed structures of the light shielding plate 11 to reach the first photosensitive sensor 031 of the photosensitive element 2. In a condition that the first photosensitive sensor 031 is located in the non-hollowed region, as shown in FIG. 7a, the light (indicated by arrows) is blocked by the light shielding plate 11, and the first photosensitive sensor 031 fails to detect the optical signal; on the other hand, in a condition that the first photosensitive sensor 031 is located in the hollowed region, as shown in FIG. 7b, the light (indicated by arrows) passes through the hollowed structures of the light shielding plate 11 and enters the first photosensitive sensor 031 of the photosensitive element 2, and the first photosensitive sensor 031 detects the optical signal.

Figure 7C:
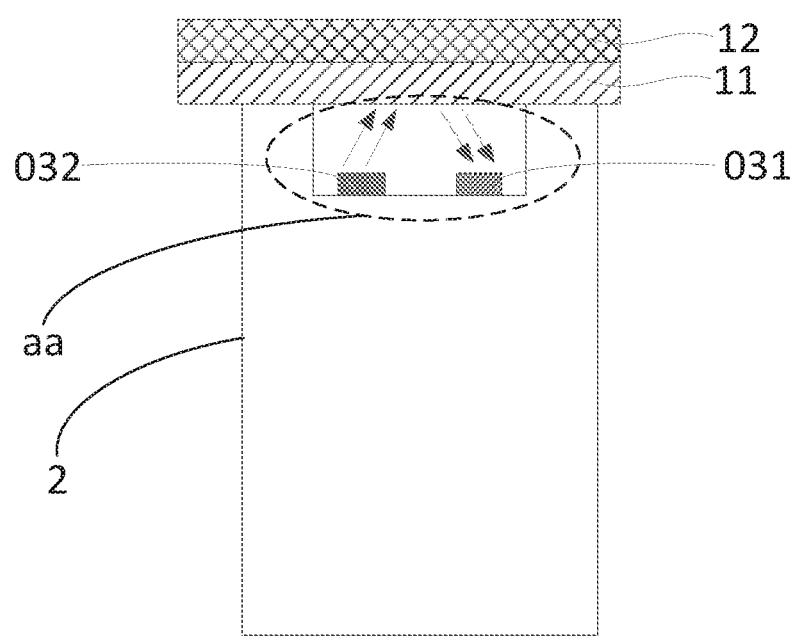
Figure 7D:
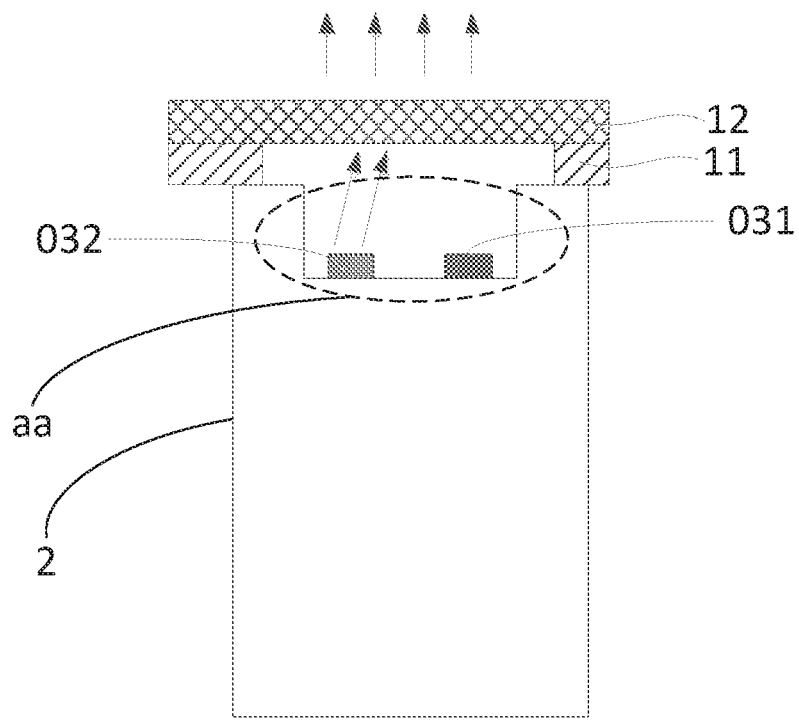

In a specific implementation, in the above-mentioned Opening/Closing door reminding device provided by the embodiment of the present disclosure, when it is at night or when there is no external light source, the light emitting diodes are turned on to operate as a light source, and FIG. 7c and FIG. 7d are schematic diagrams of the light-sensing operational principle of the Opening/Closing door reminding device provided by the embodiment of the present disclosure under the condition of the light emitting diode being a light source. Taking the case where the first photosensitive element group 03 comprises the first photosensitive sensor 031 and the first light emitting diode 032 as an example, as shown in FIG. 7c, under the condition of the first light emitting diode being used as a light source, in a condition that the first photosensitive sensor 031 and the first light emitting diode 032 are located in the non-hollowed region, as shown in FIG. 7c, the groove of the photosensitive element 2 and a bottom surface of the light shielding plate 11 cooperate with each other to define a closed space formed therebetween, and the light (indicated by the arrow) is irradiated on the mirror surface structure of the bottom surface of the light shielding plate 11 and then is reflected to the first photosensitive sensor 031. The first photosensitive sensor 031 detects the optical signal; when the first photosensitive sensor 031 and the first light emitting diode 032 are located in the hollowed region, as shown in FIG. 7d, the light (indicated by the arrow) is not blocked, and is irradiated to the light guide plate 12 through the hollowed region and is then transmitted to the external space, the first photosensitive sensor 031 fails to detect the optical signal.

Figure 8:
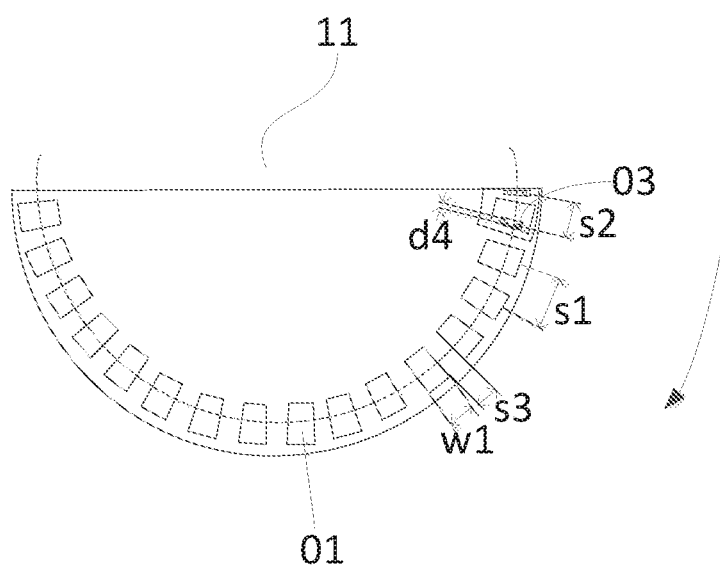
FIG. 8 is a schematic structural diagram of an Opening/Closing door reminding device according to an embodiment of the present disclosure, in which a comparison between a size of a hollowed portion and a size of the photosensitive element is shown.

Optionally, in the above-mentioned Opening/Closing door reminding device provided by the embodiment of the present disclosure, as shown in FIG. 8, a distance s1 between respective centers of two adjacent hollowed structures 01 is greater than a distance s2 between a center of the first photosensitive element group 03 and a center of the second photosensitive element group 04.

Optionally, in the above-mentioned Opening/Closing door reminding device provided by the embodiment of the present disclosure, as shown in FIG. 8, in the direction along the circular arc, a width w1 of any one of the hollowed structures 01 is equal to a distance s3 between the two adjacent sides which belong to two adjacent hollowed structures 01 respectively.

Optionally, in the above-mentioned Opening/Closing door reminding device provided by the embodiment of the present disclosure, as shown in FIG. 8, the distance s2 between the center of the first photosensitive element group 03 and the center of the second photosensitive element group 04 is larger than a sum of the width w1 of any one of the hollowed structures 01 with a width d4 of the first photosensitive element group 03 in the sliding direction of the photosensitive element 2; the distance s2 between the center of the first photosensitive element group 03 and the center of the second photosensitive element group 04 is less than a difference between the distance s1 between respective centers of two adjacent hollowed structures and the width d4 of the first photosensitive element group 03 in the sliding direction of the photosensitive element 2.

Figure 9:
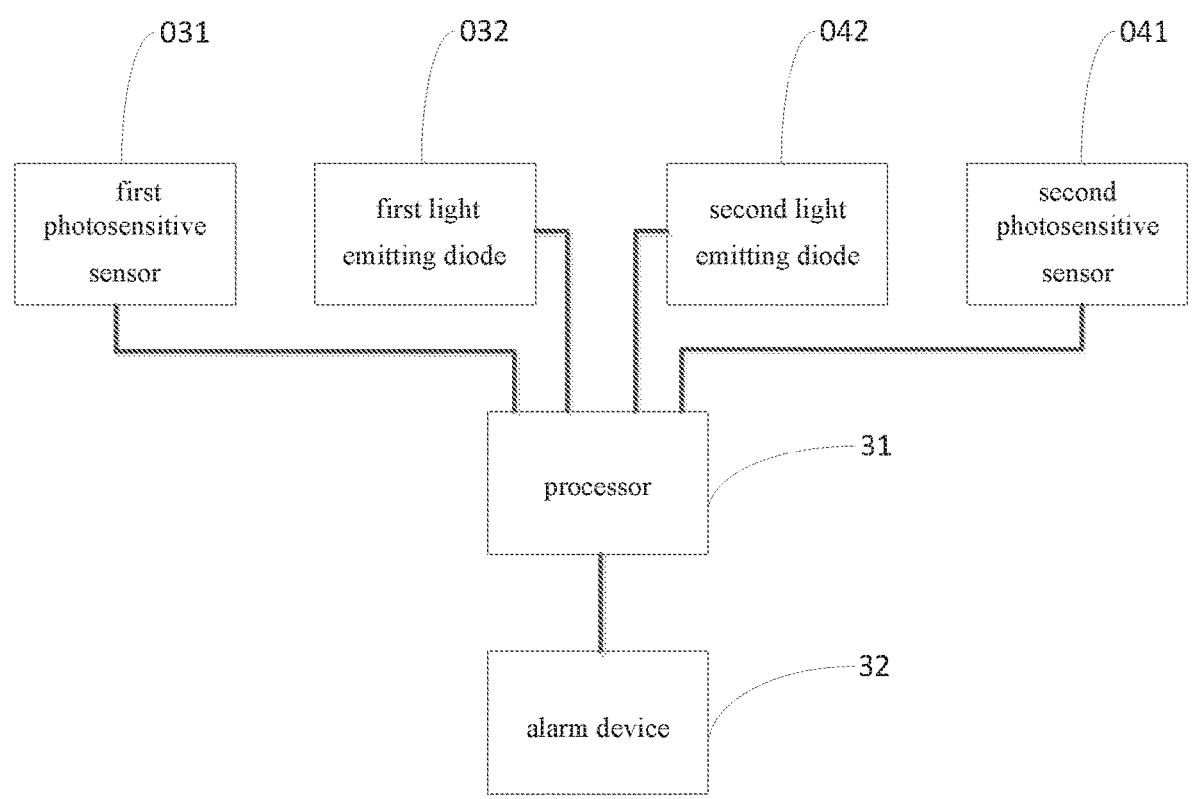
FIG. 9 is a schematic structural diagram of an Opening/Closing door reminding device according to an embodiment of the present disclosure, in which an electrical connection relationship between the photosensitive element and components of a processing element is shown.

Optionally, in the above-mentioned Opening/Closing door reminding device provided by the embodiment of the present disclosure, as shown in FIG. 9, the processing element 3 comprises: a processor 31 and an alarm device 32, and the processor 31 is connected with the first photosensitive sensor 031, the second photosensitive sensor 041, the first light emitting diode 032 and the second light emitting diode 033, respectively.

The processor 31 is configured to determine an Opening/Closing state of the door according to the received electrical signal, and the alarm device 32 is configured to send out a corresponding reminding signal according to the Opening/Closing state of the door.

The operational principle of the above-mentioned Opening/Closing door reminding device provided by the embodiment of the present disclosure will be described in detail below with reference to FIG. 10a to FIG. 10d.

An Embodiment

Figure 10A:
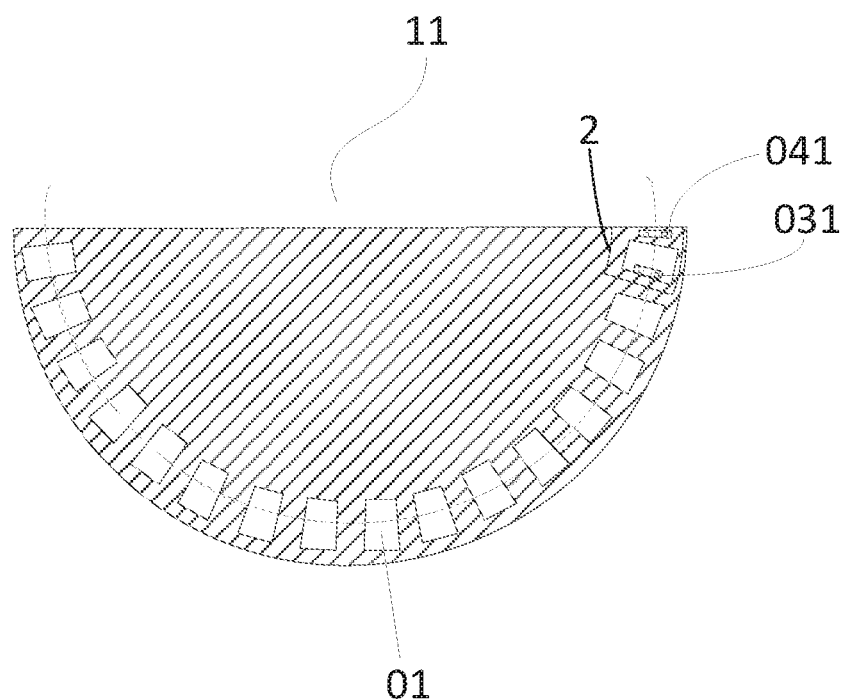
FIG. 10a-10d are operation schematic diagrams of the Opening/Closing door reminding device in the process of opening/closing a door according to an embodiment of the present disclosure, in which the positional relationship between the two photosensitive element groups of the photosensitive element and a hollowed structure of the light shielding plate are shown during the movement of the photosensitive element with the door.

Take the case of an external light source such as daylight or lamp light (that is, the operational principle shown in FIGS. 7a and 7b) as an example:

First, when the door is in a closed state, the position of the door is calibrated, as shown in FIG. 10a. At this time, the two photosensitive sensors are respectively located in the hollowed region and the non-hollowed region, taking the case where the second photosensitive sensor 041 is located in the non-hollowed region and the first photosensitive sensor 031 is located in the hollowed region (or vice versa) as example, at this time, upon irradiation by the external light source, as shown in FIG. 7a, the second light sensor 041 does not detect the light signal (a code 0 is used to indicate that the light signal is not detected in the present disclosure); as shown in FIG. 7b, the first photosensitive sensor 031 detects an optical signal (a code 1 is used to indicate that the optical signal is detected in the present disclosure), and the processor 31 in FIG. 9 records the optical signals detected by the first photosensitive sensor 031 and the second photosensitive sensor 041 and then records a current time t1, and the state of the optical signals detected by the these two corresponding sensors at this time is as shown in Table 1.

Figure 10B:
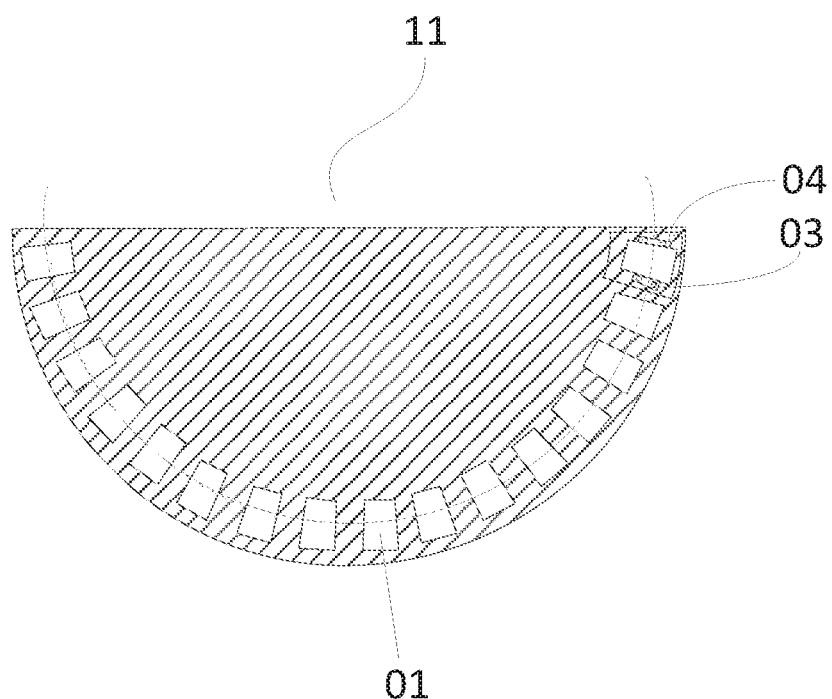

When the door is being opened, the photosensitive element 2 in the opening/closing door reminding device of the present disclosure moves with the door along the circular arc on which the hollowed regions on the outer periphery of the light shielding plate 11 are located, as shown in FIG. 10b, the first photosensitive sensor 031 enters the non-hollowed region. At this time, as shown in FIG. 8, in the direction along the circular arc, the distance s2 between the center of the first photosensitive element group 03 and the center of the second photosensitive element group 04 is larger than the sum of the width w1 of any one of the hollowed structures 01 and the widths d4 of the first photosensitive element group 03, and thus the second photosensitive sensor 041 is still located in the non-hollowed region. At this time, neither the first photosensitive sensor 031 nor the second photosensitive sensor 041 detects an optical signal (the signals are all 0), and the processor 31 in FIG. 9 records the optical signals detected by the first photosensitive sensor 031 and the second photosensitive sensor 041 and records a current time t2, and the state of the optical signals detected by the these two corresponding sensors at this time is as shown in Table 1.

Figure 10C:
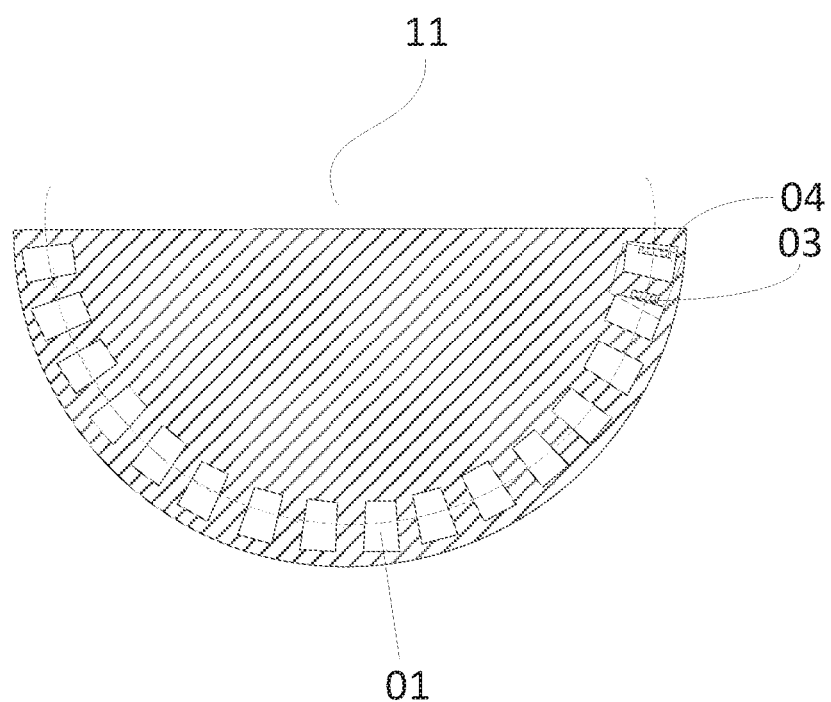

When the door is being further opened, the photosensitive element 2 in the Opening/Closing door reminding device of the present disclosure continues to perform an circular arc motion with a rotation of the door along the circular arc on which the hollowed regions on the outer periphery of the light shielding plate 11 are located, as shown in FIG. 10c, the first photosensitive sensor 031 is still in the non-hollowed region, but as shown in FIG. 8, in the direction along the circular arc, the distance s2 between the center of the first photosensitive element group 03 and the center of the second photosensitive element group 04 is less than the difference between the distance s1 between respective centers of two adjacent hollowed structures and the width d4 of the first photosensitive element group 03. Therefore, the second photosensitive sensor 041 enters the hollowed region, and the first photosensitive sensor 031 is still in the non-hollowed region, and fails to detect the optical signal (the signal code is 0), the second photosensitive sensor 041 detects the optical signal (the signal code is 1), and the processor 31 in FIG. 9 records the optical signal detected by the first photosensitive sensor 031 and the second photosensitive sensor 041 and records a current time t3, and the state of the optical signals detected by these two corresponding sensors at this time is as shown in Table 1.

Figure 10D:
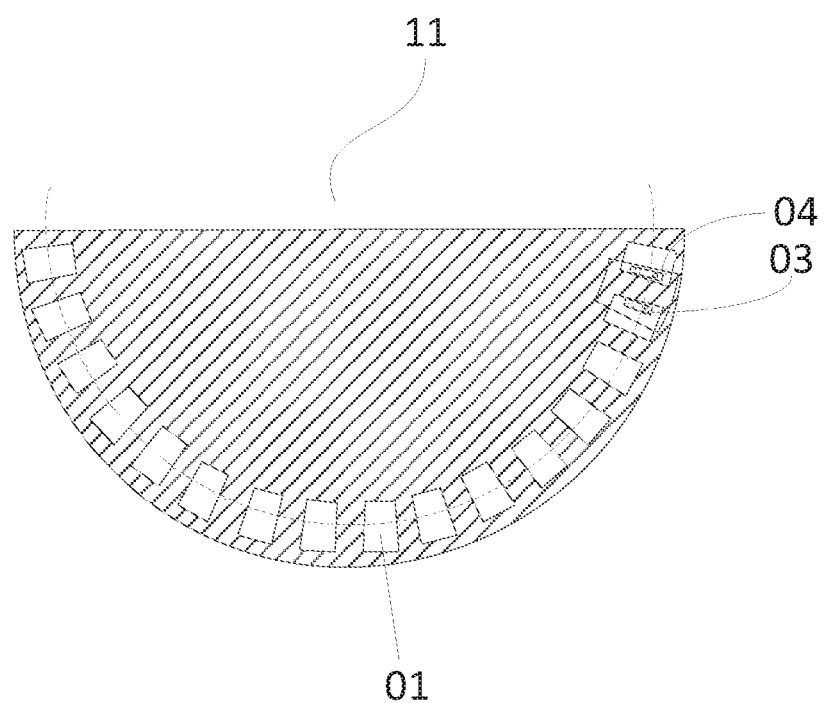

When the door is being further opened, the photosensitive element 2 in the Opening/Closing door reminding device in the present disclosure continues to perform a circular arc motion with the door along the circular arc on which the hollowed regions on the outer periphery of the light shielding plate 11 are located, as shown in FIG. 10d, the first photosensitive sensor 031 enters the next hollowed region, and detects an optical signal (signal code is 1). At this time, as shown in FIG. 8, in the direction along the circular arc, the distance s2 between the center of the first photosensitive element group 03 and the center of the second photosensitive element group 04 is larger than the sum of the width w1 of any one of the hollowed structures 01 and the width d4 of the first photosensitive element group 03, so that the second photosensitive sensor 041 is still located in the previous hollowed region, and detects the optical signal (signal code is 1), and the processor 31 in FIG. 9 records the optical signal detected by the first photosensitive sensor 031 and the second photosensitive sensor 041 and records a current time t4, and the state of the optical signal detected by the corresponding two sensors at this time is as shown in Table 1.

When the door is being further opened, the photosensitive element 2 in the Opening/Closing door device of the present disclosure continues to perform an arc motion with the door along the circular arc on which the hollowed regions on the outer periphery of the light shielding plate 11 are located, and the first photosensitive sensor 031 is still in the next hollowed region, the photosensitive sensor 031 detects an optical signal (signal code is 1), but as shown in FIG. 8, in the direction along the circular arc, the distance s2 between the center of the first photosensitive element group 03 and the second photosensitive element group 04 is less than the difference between the distance s1 between respective centers of two adjacent hollowed structures 01 and the width d4 of the first photosensitive element group 03 in the sliding direction of the photosensitive element 2, so the second photosensitive sensor 041 enters the non-hollowed region and the second photosensitive sensor 041 does not detect the optical signal (the signal code is 0), and the processor 31 in FIG. 9 records the optical signals detected by the first photosensitive sensor 031 and the second photosensitive sensor 041 and records a current time t5. The states of the optical signals detected by these two corresponding sensors are shown in Table 1. The states of the first photosensitive sensor 031 and the second photosensitive sensor 041 at this time are the same as those of the first photosensitive sensor 031 and the second photosensitive sensor 041 in FIG. 10a, and if the door is being continuously opened, the cycles of FIGS. 10a-10d are repeated again. The cycle of FIG. 10d-10a is repeated if the door is to be closed.

TABLE 1

| time | t1 | t2 | t3 | t4 | t5 |
| --- | --- | --- | --- | --- | --- |
| first photosensitive sensor 031 | 1 | 0 | 0 | 1 | 1 |
| second photosensitive sensor 041 | 0 | 0 | 1 | 1 | 0 |

Another Embodiment

Take the case of the light-emitting diode being the light source (that is, the operational principle shown in FIGS. 7c and 7d):

Above all, when the door is in the closed state, the position of the door is calibrated, as shown in FIG. 10a, at this time, the two photosensitive sensors are respectively located in the hollowed region and the non-hollowed region, and taking the case where the second photosensitive sensor 041 is located in the non-hollowed region, the first photosensitive sensor 031 is located in the hollowed region (or vice versa), as an example, the light source of the light-emitting diode emits light, as shown in FIG. 7c, a groove aa of the photosensitive element 2 and the mirror surface structure of the bottom surface of the light-shielding plate 11 cooperate with each other to define a closed space formed therebetween, and the light (indicated by arrows) is irradiated to the mirror surface structure of the bottom surface of the light shielding plate 11 and then is reflected to the second photosensitive sensor 041, and the second photosensitive sensor 041 detects the optical signal, since the first photosensitive sensor 031 and the first light emitting diode 032 are located in the hollowed region (as shown in FIG. 7d).), the light (indicated by arrows) is not blocked, and is radiated to the light guide plate 12 through the hollowed region and then radiated to the external space, so that the first photosensitive sensor 031 does not detect the optical signal, and the processor 31 in FIG. 9 records the first photosensitive sensor 031, and the second photosensitive sensor 041 detects the light signal and records a current time t1, the state of the light signal detected by the corresponding two sensors at this time is as show in Table 2.

When the door is being opened, the photosensitive element 2 in the Opening/Closing door reminding device of the present disclosure moves with the door along the circular arc on which the hollowed regions on the outer periphery of the light shielding plate 11 are located, as shown in FIG. 10b, the first photosensitive sensor 031 enters the non-hollowed region, at this time, as shown in FIG. 8, in the direction along the circular arc, the distance s2 between the center of the first photosensitive element group 03 and the center of the second photosensitive element group 04 is larger than the sum of the width w1 of any one of the hollowed structures 01 and the width d4 of the first photosensitive element group 03, and thus the second photosensitive sensor 041 is still located in the non-hollowed region. At this time, both the first photosensitive sensor 031 and the second photosensitive sensor 041 detect the optical signal (the signal is 1), and the processor 31 in FIG. 9 records the optical signals detected by the first photosensitive sensor 031 and the second photosensitive sensor 041 and records a current time t2, and the state of the optical signals detected by these two corresponding sensors at this time is as shown in Table 2.

When the door is being further opened, the photosensitive element 2 in the Opening/Closing door reminding device of the present disclosure continues to perform an circular arc motion with the door along the circular arc on which the hollowed regions on the outer periphery of the light shielding plate 11 are located, as shown in FIG. 10c, the first photosensitive sensor 031 is still in the non-hollowed region, but as shown in FIG. 8, in the direction along the circular arc, the distance s2 between the center of the first photosensitive element group 03 and the center of the second photosensitive element group 04 is less than a difference between the distance s1 between respective centers of two adjacent hollowed structures 01 and the width d4 of the first photosensitive element group 03 in the sliding direction of the photosensitive element 2, so that the second photosensitive sensor 041 enters the hollowed region, at this time the first photosensitive sensor 031 is at the non-hollowed region, and still detects the optical signal (signal code is 1), the second photosensitive sensor 041 is in the hollowed region, so fails to detect the optical signal (signal code is 0), and the processor 31 in FIG. 9 records the light signals detected by the first photosensitive sensor 031 and the second photosensitive sensor 041 and records a current time t3, and the state of the optical signals detected by these two corresponding sensors at this time is as shown in Table 2.

When the door is being further opened, the photosensitive element 2 in the Opening/Closing door reminding device of the present disclosure continues to perform an circular arc motion with the door along the circular arc on which the hollowed regions on the outer periphery of the light shielding plate 11 are located, as shown in FIG. 10d, the first photosensitive sensor 031 enters the next hollowed region, and fails to detect the optical signal (signal code is 0). At this time, as shown in FIG. 8, in the direction along the circular arc, the distance s2 between the center of the first photosensitive element group 03 and the center of the second photosensitive element group 04 is larger than a sum of the width w1 of any one of the hollowed structures 01 and the widths d4 of the first photosensitive element group 03, so that the second photosensitive sensor 041 is still located in the hollowed region, and fails to detect the optical signal (signal code is 0), and the processor 31 in FIG. 9 records the light signal detected by the first photosensitive sensor 031 and the second photosensitive sensor 041 and records a current time t4, and the state of the optical signal detected by these two corresponding sensors at this time is as shown in Table 2.

When the door is being further opened, the photosensitive element 2 in the Opening/Closing door device of the present disclosure continues to perform an circular arc motion with the door along the circular arc on which the hollowed regions on the outer periphery of the light shielding plate 11 are located, and the first photosensitive sensor 031 is still in the hollowed region, the first light sensor 031 does not detect the light signal (the signal code is 0), but as shown in FIG. 8, since the distance s2 between the center of the first photosensitive element group 03 and the center of the second photosensitive element group 04 is less than the difference between the distance s1 between respective centers of two adjacent hollowed structures 01 and the width d4 of the first photosensitive element group 03 in the sliding direction of the photosensitive element 2, so that the second photosensitive sensor 041 enters the non-hollowed region, and the second photosensitive sensor 041 detects the optical signal (Signal code is 1), the processor 31 in FIG. 9 records the optical signals detected by the first photosensitive sensor 031 and the second photosensitive sensor 041 and records a current time t5, and the state of the optical signals detected by the corresponding two sensors at this time is as shown in Table 2. The states of the first photosensitive sensor 031 and the second photosensitive sensor 041 at this time are exactly the same as those of the first photosensitive sensor 031 and the second photosensitive sensor 041 in FIG. 10a. If the door is being further opened, the cycle of FIGS. 10a-10d is repeated again. If the door is closed, the cycle of FIG. 10d-10a is repeated.

TABLE 2

| time | t1 | t2 | t3 | t4 | t5 |
|---|---|---|---|---|---|
| the first photosensitive sensor 031 | 0 | 1 | 1 | 0 | 0 |
| the second photosensitive sensor 041 | 1 | 1 | 0 | 0 | 1 |

In a specific implementation, since the hollowed structures on the peripheral region of the light shielding plate is uniformly distributed along the circular arc in the opening/closing reminding device provided by the embodiment of the present disclosure, an angle corresponding to two adjacent hollowed structures is constant, and the above process of t1 to t4, that is, an angle at which the door is rotated over through a hollowed structure is as shown in FIGS. 10a-10d, is divided by the time interval of the process, the speed of opening/closing door can be obtained.

Under normal circumstances, the angle and speed of opening/closing door being converted from the process of a person opening the door can be described as follows: the angle is gradually increased from angle 0 to angle θ, during which the speed of opening the door is increased from 0 to a maximum speed ω and then is gradually decreased to 0. Due to the individual differences, θ, ω will be different, but each of them falls within a normal range (θ1<θ<θ2, ω1<ω<ω2). Similar to the process of opening the door, when closing the door, the opening/closing angle of the door is reduced from θ to 0, the speed is also varied from 0 to ω to 0, and the speed ω is also in a range (ω3<ω<ω4).

When being in the above-mentioned normal door opening/closing process, the alarm device 32 in FIG. 9 does not alarm, and an alarm will be given when the following abnormalities occur.

When the maximum speed of opening the door is less than ω1, and the opening/closing angle θ is slowly increased from 0 to a value smaller than θ1, it indicates that the door is abnormally opened at this time, and it is possible that a child, or a small animal, opens the door.

When the maximum speed of opening the door is less than ω1, and the opening/closing angle θ is slowly increased from 0 to a range (θ1, θ2), and then in a condition that the maximum speed is less than ω3, the opening/closing angle is slowly decreased to 0, it indicates that at this time, the door is gently opened and closed by people (don't know for what purpose).

When the door is opened in the normal situation, in the process of closing the door, when the opening/closing angle of the door is not reduced to 0, it is further opened to a range of (θ1, θ2) at a normal speed. it indicates that there are many people who consecutively pass through at this time.

When the door is opened at the normal speed, but the opening/closing angle of the door is larger than θ2, and the opening/closing angle remains stationary at θ2, it indicates that the door is artificially stopped at a certain position, possibly for carrying articles and the like.

When the door is opened at a maximum speed greater than ω2, the opening/closing angle of the door is greater than θ2, or in the process of closing the door, the closing speed is greater than ω4, it indicates that the door may be violently opened or closed at this time, possibly causing damage to the door.

When the above abnormal conditions occur, the alarm device 32 in FIG. 9 will give an alarm prompt with different warning sounds to prevent the financial loss of the homeowner.

In summary, the present disclosure can determine the current state of the door by calculating the angle and speed of Opening/Closing of the door, the situations of opening the door, closing the door, slowly closing the door, violently opening/closing the door, door maintaining opened, etc., and then a reminding to opening/closing the door is performed thereby achieving a more humanized alarm effect.

Figure 11:
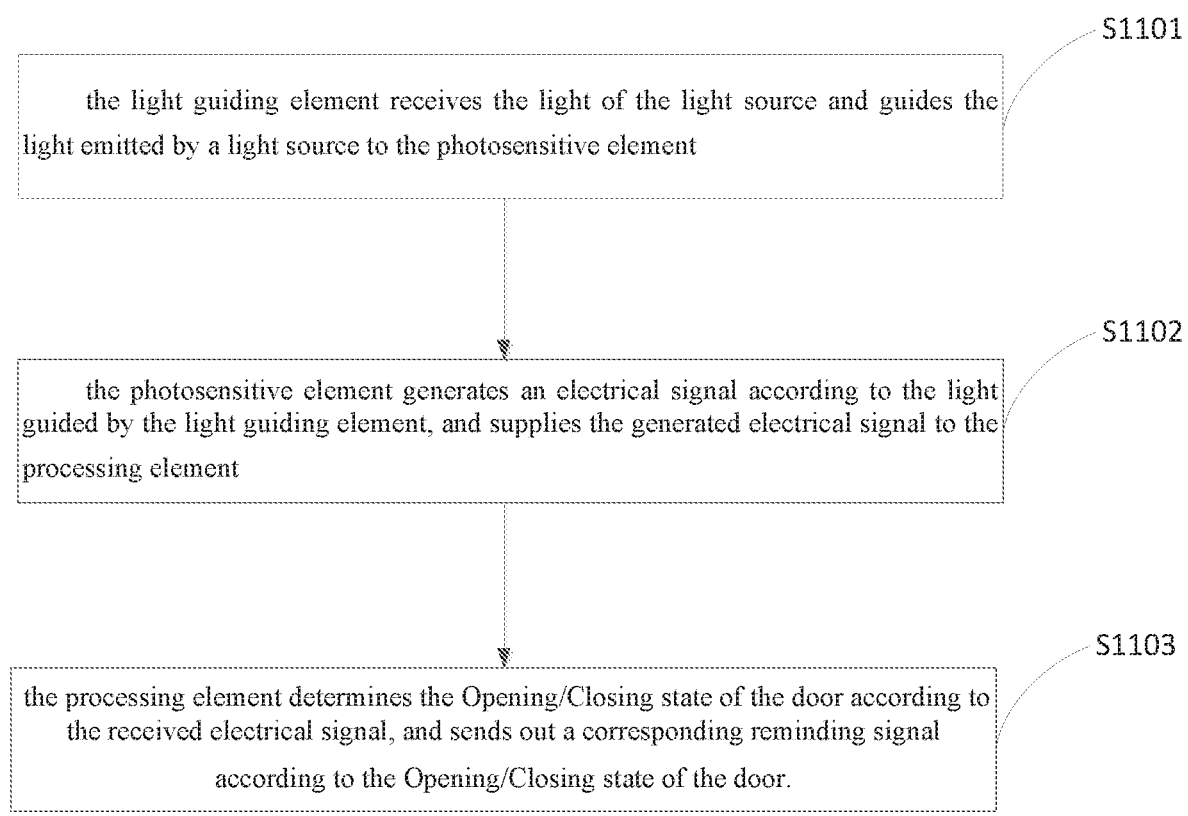
FIG. 11 is a flowchart of a method for reminding Opening/Closing of a door according to an embodiment of the present disclosure.

Based on one same inventive concept, an embodiment of the present disclosure further provides a method for reminding Opening/Closing of the door, as shown in FIG. 11.

S1101, the light guiding element receives the light of the light source and guides the light emitted by a light source to the photosensitive element;

S1102, the photosensitive element generates an electrical signal according to the light guided by the light guiding element, and supplies the generated electrical signal to the processing element:

S1103, the processing element determines the Opening/Closing state of the door according to the received electrical signal, and sends out a corresponding reminding signal according to the Opening/Closing state of the door.

The present disclosure relates to an Opening/Closing door reminding device, comprising: a light guiding element, a photosensitive element and a processing element, the light guiding element is fixed on the door frame, the photosensitive element is fixed on the door panel, and the light guiding element and the photosensitive element are kept in contact with each other when the door is in an Opening/Closing state, the light guiding element is configured to guide the light emitted by the light source to the photosensitive element. The photosensitive element converts the optical signal into an electrical signal, and provides the generated electrical signal to the processing element; the processing element determines the Opening/Closing state of the door according to the received electrical signal. If the door is abnormally opened or closed, the processing element sends out a corresponding reminding signal, so that the homeowner can monitor the Opening/Closing state of the door in real time, thereby improving the safety awareness.

It will be apparent to those skilled in the art that various changes and modifications can be made in the present disclosure without departing from the spirit and scope of the disclosure. Thus, if such modifications and variations of the present disclosure are within the scope of the appended claims and their equivalents, the present disclosure is also intended to cover such modifications and variations.

What is claimed is:

1. An Opening/Closing door reminding device, comprising: a light guiding element, a photosensitive element and a processing element, wherein the light guiding element is secured on a door frame, the photosensitive element and the processing element are both secured on a door panel, and the light guiding element and the photosensitive element are kept in contact with each other, wherein the light guiding element is configured to guide light emitted by a light source to the photosensitive element;

the photosensitive element is configured to generate an electrical signal according to the light guided by the light guiding element, and provide the generated electrical signal to the processing element;

the processing element is configured to determine an Opening/Closing state of the door according to the received electrical signal, and send out a corresponding reminding signal according to the Opening/Closing state of the door.

2. The Opening/Closing door reminding device according to claim 1, wherein the light guiding element comprises a light shielding plate, one side of the light shielding plate being kept in contact with the photosensitive element, and the light shielding plate comprises a plurality of hollowed structures uniformly disposed along an circular arc, the photosensitive element being configured to slide along the circular arc on the one side of the light shielding plate; the light shielding plate is configured to guide the light emitted by the light source through the hollowed structures.

3. The Opening/Closing door reminding device according to claim 2, wherein a portion of the photosensitive element contacting the light shielding plate is provided with a groove, and a first photosensitive element group and a second photosensitive element group which have a same structure as each other are disposed in the groove, the first photosensitive element group and the second photosensitive element group are respectively arranged in a radial direction of the circular arc and arranged side by side along the circular arc, the first photosensitive element group and the second photosensitive element group have a length in the radial direction of the circular arc which is smaller than a length of each of the hollowed structures in the radial direction of the circular arc; in which the first photosensitive element group and the second sensing element group are both configured to generate an electrical signal according to the light guided by the light guiding element, and to provide the generated electrical signal to the processing element.

4. The Opening/Closing door reminding device according to claim 3, wherein the first photosensitive element group comprises a first photosensitive sensor and a first light emitting diode, and the second photosensitive element group comprises a second photosensitive sensor and a second light emitting diode.

5. The Opening/Closing door reminding device according to claim 4, wherein a surface of the side of the light shielding plate which is in contact with the photosensitive element is a mirror surface structure for reflecting the light emitted by the first light emitting diode or the second light emitting diode to the first photosensitive sensor or the second photosensitive sensor in the groove respectively.

6. The Opening/Closing door reminding device according to claim 3, wherein the groove and the light shielding plate cooperate with each other to define a closed space formed therebetween when the photosensitive element is in contact with a portion of the light shielding plate that is not hollowed out.

7. The Opening/Closing door reminding device according to claim 4, wherein the processing element comprises: a processor and an alarm device, the processor is connected with the first photosensitive sensor, the second photosensitive sensor, the first light emitting diode and the second light emitting diode respectively;
the processor is connected to the alarm device and is configured to determine an Opening/Closing state of the door according to the received electrical signal, and instruct the alarm device to send out a corresponding reminding signal according to the Opening/Closing state of the door.

8. The Opening/Closing door reminding device according to claim 3, wherein a distance between respective centers of two adjacent hollowed structures is greater than a distance between a center of the first photosensitive element group and a center of the second photosensitive element group.

9. The Opening/Closing door reminding device according to claim 3, wherein in a direction along the circular arc, a distance between a center of the first photosensitive element group and a center of the second photosensitive element group is larger than a sum of a width of each of the hollowed structures and a width of the first photosensitive element group; the distance between the center of the first photosensitive element group and the center of the second photosensitive element group is less than a difference between a distance between respective centers of two adjacent hollowed structures and the width of the first photosensitive element group.

10. The Opening/Closing door reminding device according to claim 3, wherein the photosensitive element is in a columnar shape with a fan section, and the groove is disposed in a bottom surface of the columnar shape being in contact with the light shielding plate.

11. The Opening/Closing door reminding device according to claim 2, wherein in a direction along the circular arc, a width of each of the hollowed structures is equal to a distance between two adjacent sides which respectively belong to two adjacent hollowed structures.

12. The Opening/Closing door reminding device according to claim 2, wherein the light shielding plate is in a shape of a semicircular, and the plurality of hollowed structures are disposed on an outer periphery of the light shielding plate.

13. The Opening/Closing door reminding device according to claim 2, wherein the light guiding element further comprises a light guiding plate disposed on a side of the light shielding plate facing away from the photosensitive element.

14. The Opening/Closing door reminding device according to claim 13, wherein the light guide plate is in a same shape as the light shielding plate.

15. A method for reminding Opening/Closing of a door using the Opening/Closing door reminding device according to claim 1, wherein it comprises following steps,
the light guiding element receives the light of the light source and guides the light emitted by a light source to the photosensitive element;
the photosensitive element generates an electrical signal according to the light guided by the light guiding element, and supplies the generated electrical signal to the processing element;
the processing element determines the Opening/Closing state of the door according to the received electrical signal, and sends out a corresponding reminding signal according to the Opening/Closing state of the door.

16. The method according to claim 15, wherein the step of the processing element determining the Opening/Closing state of the door according to the received electrical signal, and sending out a corresponding reminding signal according to the Opening/Closing state of the door comprises,
in case where the maximum speed of opening door is less than a first threshold speed, and the opening angle of the door is increased from zero degree to an angle smaller than a first threshold angle, a first reminding signal is sent out;
in case where the maximum speed of opening door is less than a first threshold speed, and the opening angle of the door is increased from zero degree to a first angle between the first threshold angle and a second threshold angle, then the maximum speed of closing door is less than a third threshold speed, the opening angle of the door is decreased from the first angle to zero degree, a second reminding signal is sent out, wherein the second threshold angle is greater than the first threshold angle;
in case where the maximum speed of opening door is between the first threshold speed and the second threshold speed, and the opening angle of the door is increased from zero degree to the first angle, then the maximum speed of closing door is between the third threshold speed and the fourth threshold speed, the opening angle of the door is decreased from the first angle to a second angle between zero degree and the first threshold angle and then is increased from the second angle to the first angle, a third reminding signal is sent out, wherein the second threshold speed is greater than the first threshold speed, and the third threshold speed is less than the fourth threshold speed;
in case where the maximum speed of opening door is between the first threshold speed and the second threshold speed, and the opening angle of the door is increased from zero degree to a third angle greater than the second threshold angle, a fourth reminding signal is sent out;
in case where the maximum speed of opening door is greater than the second threshold speed, and the opening angle of the door is increased from zero degree to a third angle greater than the second threshold angle, or the maximum speed of closing door is greater than the fourth threshold speed, a fifth reminding signal is sent out.

* * * * *